United States Patent
Kozakai et al.

(10) Patent No.: US 8,762,796 B2
(45) Date of Patent: Jun. 24, 2014

(54) COMMUNICATION DEVICE AND TIME SYNCHRONIZATION SYSTEM

(75) Inventors: Yasuyuki Kozakai, Kanagawa (JP); Mitsuru Kanda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 13/432,420

(22) Filed: Mar. 28, 2012

(65) Prior Publication Data

US 2012/0254674 A1    Oct. 4, 2012

Related U.S. Application Data

(63) Continuation of application No. PCT/JP2009/071632, filed on Dec. 25, 2009.

(51) Int. Cl.
*G06F 11/00* (2006.01)

(52) U.S. Cl.
USPC .................. 714/55; 714/4.1; 370/395.62

(58) Field of Classification Search
USPC ................... 714/4.1, 55; 370/395.62
See application file for complete search history.

(56) References Cited

U.S. PATENT DOCUMENTS

| | | | |
|---|---|---|---|
| 7,873,862 B2* | 1/2011 | Carlson et al. | 714/4.1 |
| 2007/0058812 A1* | 3/2007 | Ali et al. | 380/274 |
| 2009/0157862 A1* | 6/2009 | Ogawa et al. | 709/223 |
| 2009/0276542 A1* | 11/2009 | Aweya et al. | 709/248 |
| 2010/0024000 A1* | 1/2010 | Holtzman et al. | 726/2 |
| 2010/0083025 A1* | 4/2010 | Shibata | 713/503 |
| 2010/0100761 A1* | 4/2010 | Carlson et al. | 714/4 |

FOREIGN PATENT DOCUMENTS

| | | |
|---|---|---|
| JP | 2007-178363 | 7/2007 |
| JP | 2009-157913 | 7/2009 |
| JP | 2009-199139 | 9/2009 |

OTHER PUBLICATIONS

International Search Report for PCT/JP2009/071632, mailed Mar. 9, 2010.
IEEE Standard for a Precision Clock Synchronization Protocol for Networked Measurement and Control Systems.
Meier et al., IEEE Standard for a Precision Clock Synchronization Protocol for Networked Measurement and Control Systems.

\* cited by examiner

*Primary Examiner* — Chae Ko
(74) *Attorney, Agent, or Firm* — Nixon & Vanderhye, P.C.

(57) ABSTRACT

In an embodiment, provided is a communication device connected to time servers via a network with transfer devices. In the communication device: a network controller receives a message containing time information counted by the time server and containing a network identifier, and obtains a receiving timing of the message; a network processing unit, when the network identifier in the message does not match with any network identifier, destroys the message; a protocol processing unit, when the network identifier has a match, calculates a time error by the time information in the message and the receiving timing, detects whether a first time server is malfunctioning, and when detected the first time server malfunctioning, outputs the time error calculated by a network identifier assigned to a second time server; a servo calculates an operation amount by the time error; and a clock varies a clock rate according to the operation amount.

5 Claims, 12 Drawing Sheets

FIG.12

| TIME SERVER | TIMING IN TIME SERVER AT Sync MESSAGE RECEIVING TIMING | CLOCK COUNTER AT Sync MESSAGE RECEIVING TIMING | TIME ERROR PER SECOND CAUSED BY DIFFERENCE IN CLOCK RATES |
|---|---|---|---|
| 101 | 12/03/2009 10 h 20 m 10.628393217 s | 2341921232 | 53001 ns |
| 104 | 12/03/2009 10 h 20 m 10.128393823 s | 2329421232 | 53031 ns |

COMMUNICATION DEVICE AND TIME SYNCHRONIZATION SYSTEM

CROSS-REFERENCE TO RELATED APPLICATIONS

This application is a continuation of PCT international application Ser. No. PCT/JP2009/071632 filed on Dec. 25, 2009 which designates the United States; the entire contents of which are incorporated herein by reference.

FIELD

The present invention relates to a communication device and a time synchronization system.

BACKGROUND

A typical technology is known by which a communication device synchronizes the time thereof with the time of a time server by means of communication with the time server. A protocol specification IEEE 1588-2008 (hereinafter, referred to as IEEE 1588) is disclosed for highly accurate synchronization of the time within, for example, a Local Area Network (LAN). In this technology, a communication device refers to the time announced via multicast by a time server compliant to IEEE 1588 and refers to a communication delay occurring between the communication device and the time server, and accordingly synchronizes the time thereof with the time of the time server. Meanwhile, when a plurality of time servers is present in the same network in a communicable manner, only the time server having the highest priority announces the time thereof. Moreover, also disclosed is a method by which a plurality of time servers announces the respective time. That method is called Alternate master option. According to that method, a communication device periodically receives time from the time servers equipped with the Alterna master option function. Thus, even if any of the time servers is malfunctioning, the communication device is able to receive the timings from the other time servers. That enables the communication device to maintain the timing accuracy.

However, in IEEE 1588, all time servers in the same domain determine the respective internal conditions by means of negotiation, and make changes in the operation of communicating messages according to the internal conditions. Herein, the behavior of any one time server affects the other time servers. For example, in case a particular time server starts malfunctioning and sends an Announce message in which the parameter indicating the priority of that time server is set to a value not intended by the administrator, then the other time servers may temporarily stop announcing the respective time. Besides, at the time of restoring a time server or while performing maintenance, if incorrect settings are performed with respect to a time server to be newly connected to the network, then the other time servers may temporarily stop announcing the respective time. As a result, the communication device suffers from a timing drift during the period of not receiving the timings from the time servers.

Further, a time synchronization system is disclosed in which a single time server is connected to each of two networks and a communication device is connected to both the networks so as to make the time servers redundant. Here, Grandmaster represents the time servers and Ordinary clock represents the communication device. Of the two time servers each connected to a network, one time server serves as a main time server and the other time server serves as a sub-time server. The communication device synchronizes with the time of the main time server and, when communication cannot be performed with the main time server, switches to the sub-time server as the target time server for time synchronization. In this way, by making the communication paths and the time servers redundant, the reliability of the time synchronization system is enhanced.

However, in the technology disclosed above, when a plurality of time servers is installed in the same network and is made redundant, there is a risk that the time accuracy of the communication device may not be maintained in case a time server is malfunctioning or is being restored.

BRIEF DESCRIPTION OF THE DRAWINGS

FIG. 12 is a diagram illustrating sets of correction data.

DETAILED DESCRIPTION

According to an embodiment, provided is a communication device that is connected to a plurality of time servers via a network configured with one or more transfer devices. The communication device includes: a network controller configured to receives a message containing time information which indicates time counted by one of the time servers and containing a network identifier, and configured to obtains a receiving timing of receiving the message; a network processing unit configured to, when the network identifier specified in the message does not match with any network identifier assigned to any one of the plurality of time servers, destroys the message; a protocol processing unit configured to, when the network identifier has a match, calculates a time error by referring to the time information specified in the message and by referring to the receiving timing, configured to detects whether a first time server is malfunctioning, and configured to, when it is detected that the first time server is malfunctioning, outputs the time error calculated by referring to a message containing a network identifier assigned to a second time server; a servo configured to calculates an operation amount by referring to the time error; and a clock configured to varies a clock rate according to the operation amount.

Exemplary embodiments of a communication device and a time synchronization system are described below in detail with reference to the accompanying drawings.

First Embodiment

Figure 1:
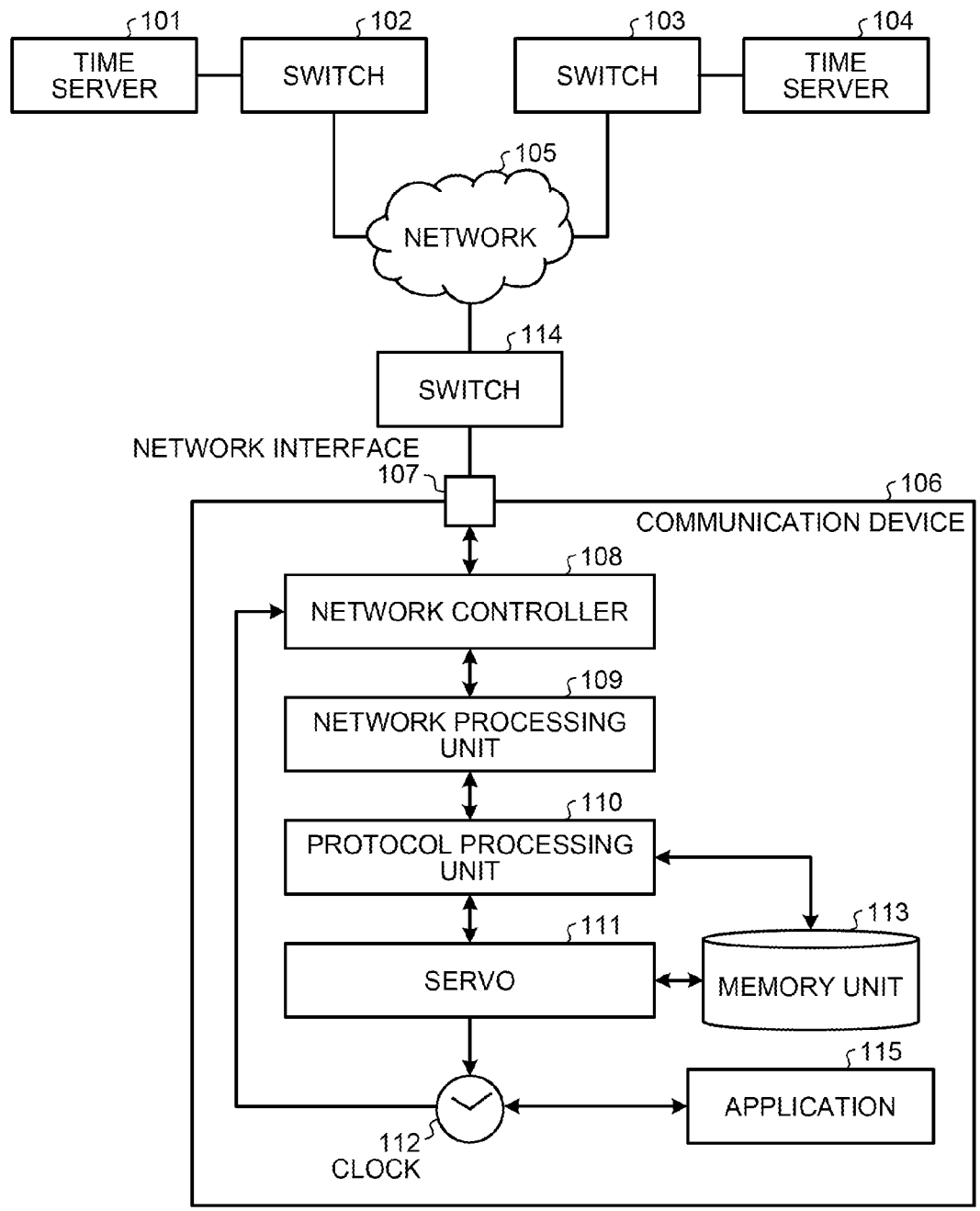
FIG. 1 is a diagram illustrating a configuration of a time synchronization system according to a first embodiment.

FIG. 1 is a diagram illustrating a configuration of the time synchronization system. As illustrated in FIG. 1, the time synchronization system includes a time server 101, a switch 102, a switch 103, a time server 104, a network 105, and a communication device 106. Thus, the configuration is such that the two time servers 101 and 104 are connected to the same network 105. In the time synchronization system, the communication device 106 performs time synchronization with the time server 101 or the time server 104 using, for example, a VLAN compliant to 802.1Q. The time servers 101 and 104 announce respective timings and are equipped with, for example, a time synchronization protocol function of IEEE 1588. However, the time servers 101 and 104 need not be equipped with the Alternate master option function of IEEE 1588. Each of the time servers 101 and 104 is assigned with a unique VLAN ID. Meanwhile, herein, it is assumed that the time server 101 serves as the main time server and the time server 104 serves as the sub-time server. The time server 101 is connected to the network 105 via the switch 102, while the time server 104 is connected to the network 105 via the switch 103. The communication device 106 is connected to the network 105 via a switch 114. The network 105 can be, for example, Ethernet (registered trademark), FDDI, PLC, wireless LAN, WiMAX, Jigbee, LTE, CAN, or Profinet. Herein, it is assumed that the network 105 is Ethernet (registered trademark). The switches 102, 103, and 114 are transfer devices equipped with, for example, an Ethernet (registered trademark) switch function. Herein, it is assumed that each of the communication device 106, the switch 114, the switch 102, and the switch 103 measures a communication delay with the adjacent IEEE 1588 by implementing a method called Peer to peer delay mechanism that is defined in IEEE 1588.

Figure 2:
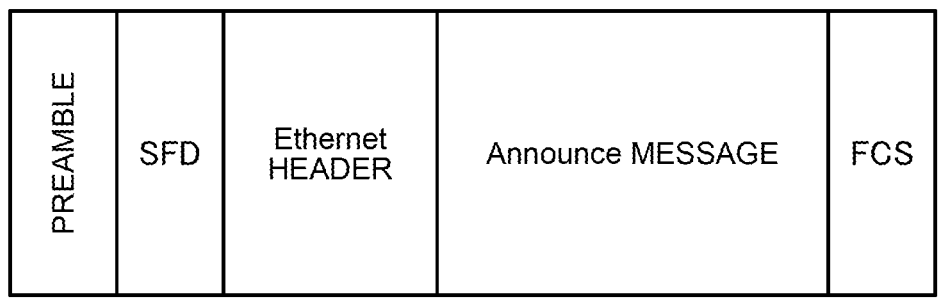
FIG. 2 is a diagram illustrating an Announce message.
Figure 3:
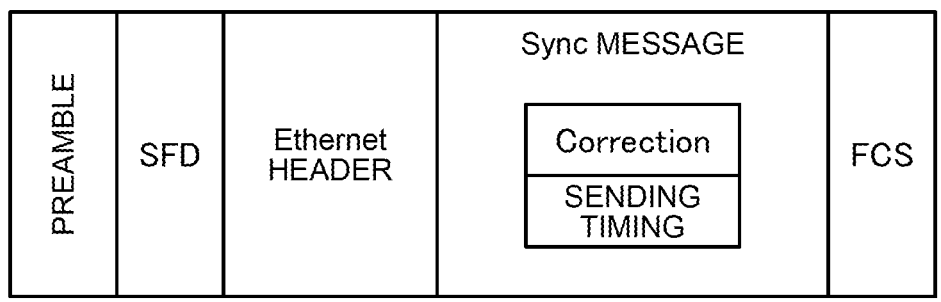
FIG. 3 is a diagram illustrating a Sync message.

Explained below is the configuration of each of the time server 101, the switch 102, the switch 103, the time server 104, the network 105, and the communication device 106. Upon receiving from the switch 102 a PDelay_Req message having a multicast address as the address, the time server 101 sets a multicast address as the address and sends a PDelay_Response message that contains a time stamp representing the receiving timing of receiving the PDelay_Req message and contains a time stamp representing the sending timing of sending the PDelay_Response message. Besides, the time server 101 periodically sends an Announce message in which the multicast address is set in the destination address of the Ethernet (registered trademark) header, as well as periodically sends a Sync message in which the multicast address is set in the destination address of the Ethernet (registered trademark) header and which contains time information indicating the sending timing of the Sync message. The Announce message and the Sync message are messages defined in IEEE 1588. FIG. 2 is a diagram illustrating an Announce message. FIG. 3 is a diagram illustrating a Sync message. As illustrated in FIG. 3, a Sync message contains time information about the timing which is counted by the time server 101 and which indicates the sending timing of the Sync message. Moreover, a Sync message contains a Correction field, in which is set an initial value for time correction. That initial value is reset to a value obtained by the switch 102 (described later) by adding a transfer operation time of the Sync message and the value of a communication delay with the time server 101.

Upon receiving from the switch 103 a PDelay_Req message having a multicast address as the address, the time server 104 sets a multicast address as the address and sends a PDelay_Response message that contains a time stamp representing the receiving timing of receiving the PDelay_Req message and contains a time stamp representing the sending timing of sending the PDelay_Response message. Besides, in an identical manner to the time server 101, the time server 104 periodically sends an Announce message in which the multicast address is set in the destination address of the Ethernet (registered trademark) header, as well as periodically sends a Sync message in which the multicast address is set in the destination address of the Ethernet (registered trademark) header and which contains time information indicating the sending timing of the Sync message. The Announce message and the Sync message are messages identical to those illustrated in FIG. 2 and FIG. 3, respectively. In the Correction field included in the Sync message is reset a value obtained by the switch 103 (described later) by adding the transfer operation time of the Sync message and the value of communication delay with the time server 104.

Figure 4:
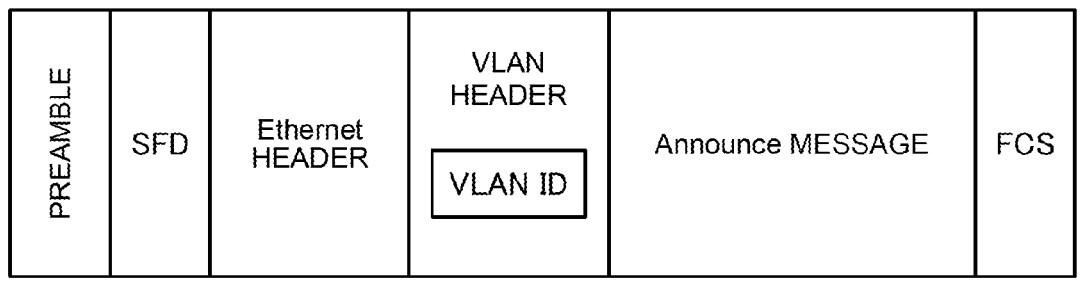
FIG. 4 is a diagram illustrating an Announce message appended with a VLAN header.
Figure 5:
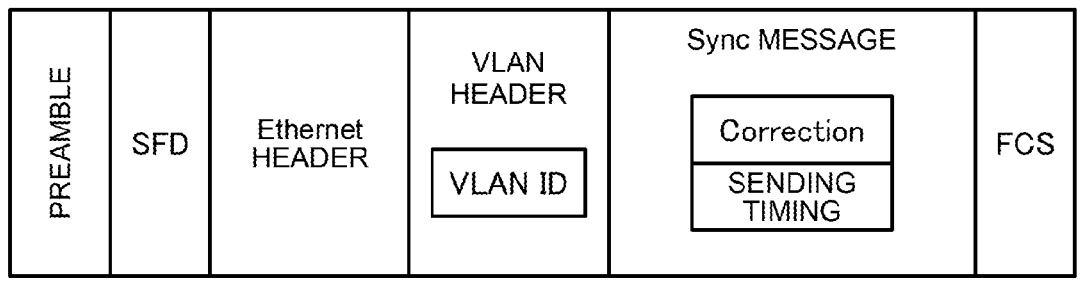
FIG. 5 is a diagram illustrating a Sync message appended with a VLAN header.

The switch 102 sends a PDelay_Req message having a multicast address as the address and receives in response, from the time server 101, a PDelay_Response message having a multicast address as the address. Then, the switch 102 refers to the time stamps included in the PDelay_Response message and calculates the communication delay with the time server 101. Besides, upon receiving an Announce message or a Sync message sent by the time server 101, the switch 102 appends a VLAN header, which contains the VLAN ID assigned to the time server 101, to the Announce message or the Sync message; and transfers that message to the network 105. At that time, regarding the Sync message, the switch 102 adds the transfer operation time of the Sync message and the value of communication delay with the time server 101 to the value in the Correction field of the Sync message, sets the added value in the Correction field of the Sync message, and then transfers the Sync message to the network 105. Herein, the VLAN header is a tag compliant to, for example, 802.1Q. FIG. 4 is a diagram illustrating an Announce message appended with a VLAN header. As illustrated in FIG. 4, a VLAN header containing the VLAN ID is appended to the Announce message illustrated in FIG. 2. FIG. 5 is a diagram illustrating a Sync message appended with a VLAN header. As illustrated in FIG. 5, a VLAN header containing the VLAN ID is appended to the Sync message illustrated in FIG. 3.

Moreover, when the switch 102 receives an Announce message or a Sync message that has been sent via multicast in the network 105 and when such a message has a VLAN header appended thereto, the switch 102 refers to the VLAN ID specified in the VLAN header and determines whether or not that VLAN ID is same as the VLAN ID assigned to the time server 101. If that VLAN ID is same as the VLAN ID assigned to the time server 101, then the switch 102 removes the VLAN header from the received message and transfers the message to the time server 101. For example, the switch 102 removes the VLAN header from the Announce message illustrated in FIG. 4 and then transfers the Announce message, in the form illustrated in FIG. 2, to the time server 101. Similarly, the switch 102 removes the VLAN header from the Sync message illustrated in FIG. 5 and then transfers the Sync message, in the form illustrated in FIG. 3, to the time server 101. On the other hand, if the VLAN ID specified in the VLAN header appended to the Announce message or the Sync message that has been received is not same as the VLAN ID assigned to the time server 101, then the switch 102 does not send that message to the time server 101. For example, the Announce message or the Sync message that is transferred by the time server 104 via the switch 103 (described later) falls under this category.

The switch 103 sends a PDelay_Req message having a multicast address as the address and receives in response, from the time server 104, a PDelay_Response message having a multicast address as the address. Then, the switch 103 refers to the time stamps included in the PDelay_Response message and calculates the communication delay with the time server 104. Besides, upon receiving an Announce message or a Sync message sent by the time server 104, the switch 103 appends a VLAN header, which contains the VLAN ID assigned to the time server 101, to the Announce message or the Sync message; and transfers that message to the network 105. At that time, regarding the Sync message, the switch 102 adds the transfer operation time of the Sync message and the value of communication delay with the time server 101 to the value in the Correction field of the Sync message, sets the added value in the Correction field of the Sync message, and then transfers the Sync message to the network 105. The message appended with a VLAN header is identical to that illustrated in FIG. 4 or FIG. 5.

Moreover, when the switch 103 receives an Announce message or a Sync message that has been sent via multicast in the network 105 and when such a message has a VLAN header appended thereto, then the switch 103 refers to the VLAN ID specified in the VLAN header and determines whether or not that VLAN ID is same as the VLAN ID assigned to the time server 104. If that VLAN ID is same as the VLAN ID assigned to the time server 104, then the switch 103 removes the VLAN header from the received message and transfers the message to the time server 104. On the other hand, if the VLAN ID is not same as the VLAN ID assigned to the time server 104, then the switch 103 does not send that message to the time server 104. For example, the Announce message or the Sync message that is transferred by the time server 101 via the switch 102 falls under this category.

When the switch 114 receives from the communication device 106 a PDelay_Req message having a multicast address as the address, it sets a multicast address as the address and sends a PDelay_Response message that contains a time stamp representing the receiving timing of receiving the PDelay_Req message and contains a time stamp representing the sending timing of sending the PDelay_Response message. Moreover, when the switch 114 receives an Announce message or a Sync message from the time server 101 or the time server 104 via the network 105, it transfers the received message to the communication device 106 without removing the VLAN header. Furthermore, regarding an Announce message or a Sync message appended with a VLAN header containing the VLAN ID of the time server 101 by the communication device 106 or regarding an Announce message or a Sync message appended with a VLAN header containing the VLAN ID of the time server 104 by the communication device 106, the switch 114 transfers that message without modification to the network 105.

The communication device 106 includes a network interface 107, a network controller 108, a network processing unit 109, a protocol processing unit 110, a servo 111, a clock 112, a memory unit 113, and an application 115. The network interface 107 is a communication interface compatible to the communication method of the network 105 and controls the communication between the communication device 106 and the network 105. Herein, it is assumed that the network interface 107 is a communication interface compatible to the communication method of Ethernet (registered trademark).

The network controller 108 obtains, as a time stamp, the sending timing of sending a message to the time server 101 or the time server 104; as well as obtains, as a time stamp, the receiving timing of receiving a Sync message from the time server 101 or the time server 104. The network processing unit 109 performs operations corresponding to the communication method to which the network interface 107 is compatible. When the VLAN ID that is specified in the VLAN header appended in a Sync message received from the time server 101 is same as the VLAN ID assigned to the time server 101 or the time server 104, the network processing unit 109 sends to the protocol processing unit 110 that Sync message along with the time stamp indicating the receiving timing of receiving that Sync message. On the other hand, if the above-mentioned VLAN ID is not same as the VLAN ID assigned to the time server 101 or the time server 104, the network processing unit 109 destroys that Sync message. Besides, to the message to be sent to the time server 101 or the time server 104, the network processing unit 109 appends a VLAN header that contains the VLAN ID assigned to the corresponding server.

The protocol processing unit 110 performs operations according to a time synchronization protocol such as IEEE 1588. The protocol processing unit 110 sends a PDelay_Req message having a multicast address as the address and receives in response, from the switch 114, a PDelay_Response message having a multicast address as the address. Then, the protocol processing unit 110 refers to the time stamp specified in the PDelay_Response and measures the communication delay with the switch 114. Besides, upon receiving from the network processing unit 109 the Sync message sent by the time server 101 and the time stamps, the protocol processing unit 110 refers to the time information and the time stamps specified in that Sync message; calculates a time error with respect to the time server 101; and, when the time server 101 is not detected to be malfunctioning, outputs the calculated time error to the servo 111. The method of detecting whether or not the time server 101 is malfunctioning is described later. Meanwhile, upon receiving from the network processing unit 109 the Sync message sent by the time server 104 and the time stamps, the protocol processing unit 110 refers to the time information specified in that Sync message and the time stamps; calculates a time error with respect to the time server 104; and, when the time server 101 is detected to be malfunctioning, stores the calculated time error in the memory unit 113. On the other hand, if the time server 101 is not detected to be malfunctioning, the protocol processing unit 110 outputs the calculated time error to the servo 111.

The servo 111 is a control unit configured with, for example, a digital filter or PID control. The servo 111 calculates an operation amount by referring to the time error output by the protocol processing unit 110 and outputs the operation amount to the clock 112. For example, when the clock 112 is a voltage-controlled crystal oscillator, the operation amount is in the form of voltage. When the clock 112 is an Adder Based Clock, the operation amount is in the form of the frequency and an increment in the counter used while increasing the counter of the clock 112. Herein, the clock 112 is, for example, a voltage-controlled crystal oscillator or an Adder Based Clock, and counts the clock. Depending on the operation amount output by the servo 111, the clock 112 varies the clock rate.

The memory unit 113 is configured with, for example, a register or a RAM and is used in storing, under the control of the protocol processing unit 110, the time error calculated by the protocol processing unit 110. Besides, the memory unit 113 stores therein in advance the priority of the time servers 101 and 104 as defined in IEEE 1588. It is assumed that the time server 101 has a higher priority stored in the memory unit 113 as compared to the priority of the time server 104. The application 115 is an application program for referring to the current time counted by the clock 112.

Figure 6:
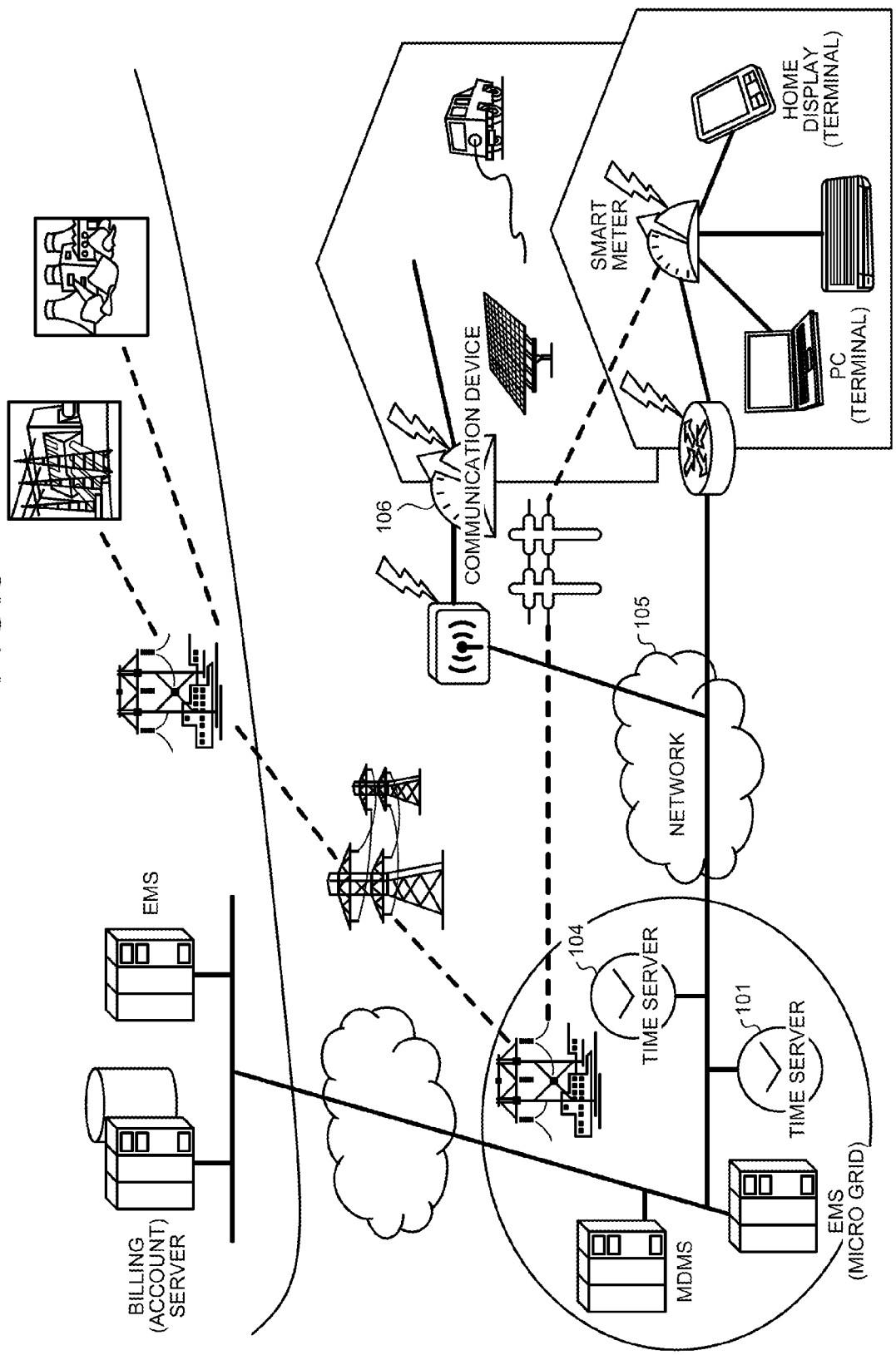
FIG. 6 is a diagram of an application example of the time synchronization system.

In the time synchronization system described above, the two time servers 101 and 104 installed in the same network 105 are assigned with mutually exclusive VLAN IDs. The switch 102 appends a VLAN header, which contains the VLAN ID assigned to the time server 101, to an Announce message or a Sync message sent by the time server 101. Moreover, the switch 102 ensures that an Announce message or a Sync message that is appended with a VLAN header containing the VLAN ID of the time server 104 is not transferred to the time server 101. Similarly, the switch 103 appends a VLAN header, which contains the VLAN ID assigned to the time server 104, to an Announce message or a Sync message sent by the time server 104. Moreover, the switch 103 ensures that an Announce message or a Sync message that is appended with a VLAN header containing the VLAN ID of the time server 101 is not transferred to the time server 104. In this way, the time servers 101 and 104 are disabled from communicating with each other. In contrast, irrespective of whether an Announce message or a Sync message is appended with a VLAN header containing the VLAN ID of the time server 101 or is appended with a VLAN header containing VLAN ID the time server 104, the communication device 106 receives that message without modification. As described above, the time server 101 serves as the main time server. Hence, when the time server 101 is functioning normally, the communication device 106 refers to the Sync message and synchronizes the time with the time of the time server 101. However, when the time server 101 is detected to be malfunctioning, the communication device 106 switches the target of time synchronization to the time server 104. Thus, the communication device 106 refers to the Sync message sent by the time server 104 and synchronizes the time with the time of the time server 104. Such a time synchronization system is applicable, for example, to a distributed power control network illustrated in FIG. 6; applicable to industrial networks such as electric power substations, factories, or trains; and applicable to home networks.

Figure 7:
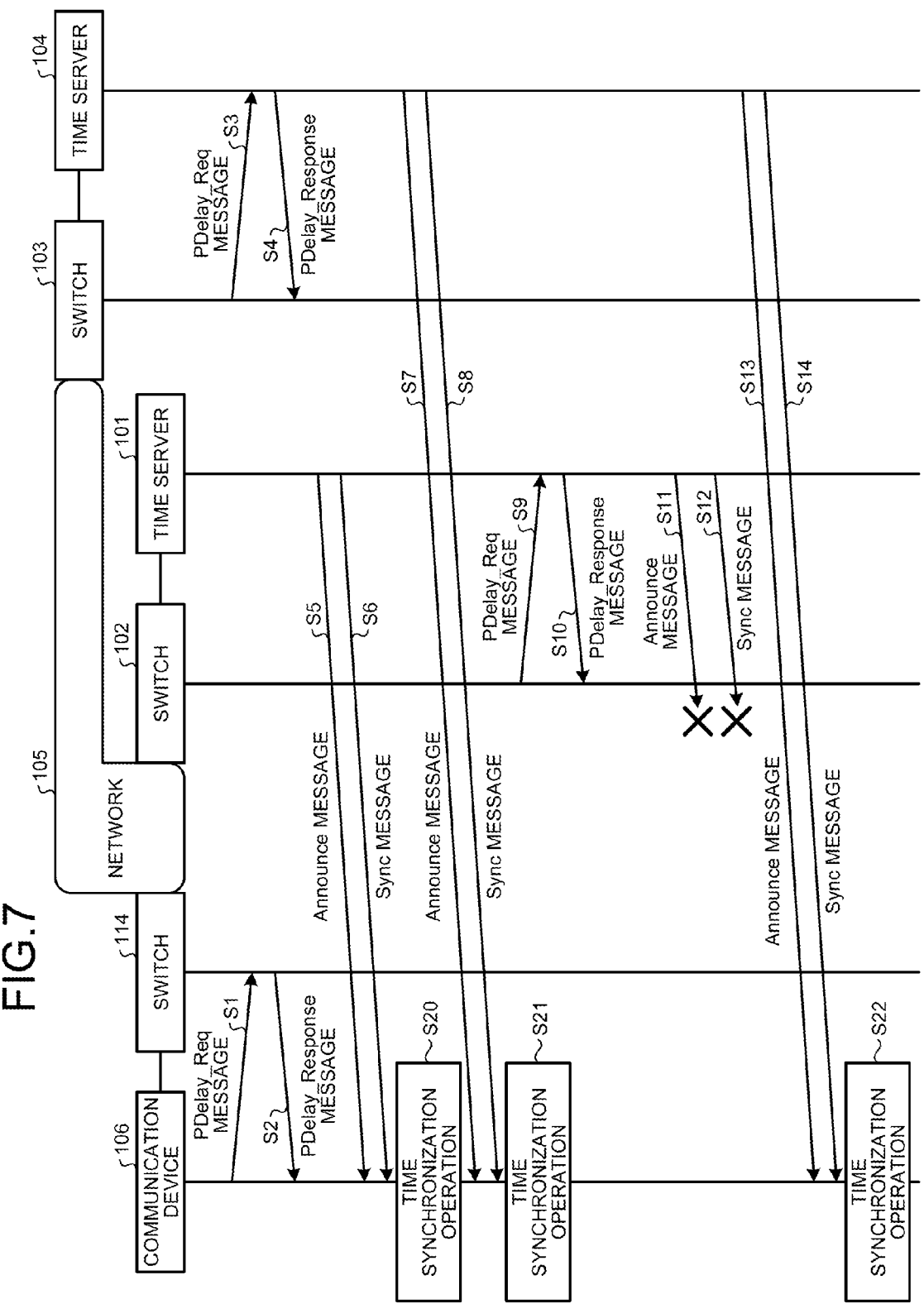
FIG. 7 is a flowchart for explaining a sequence followed in a time synchronization communication operation.

Explained below with reference to FIG. 7 is a sequence followed in a time synchronization communication operation performed in the time synchronization system according to the first embodiment. The communication device 106 sends a PDelay_Req message having a multicast address as the address (Step S1). Upon receiving that PDelay_Req message, the switch 114 sends a PDelay_Response message having a multicast address as the address (Step S2). The communication device 106 refers to the time stamps specified in the PDelay_Response and measures the communication delay with the switch 114.

In an identical manner to the communication device 106, the switch 103 sends a PDelay_Req message having a multicast address as the address (Step S3). Upon receiving that PDelay_Req message, the time server 104 sends a PDelay_Response message having a multicast address as the address (Step S4). The switch 103 refers to the time stamps specified in the PDelay_Response and measures the communication delay with the time server 104. Moreover, in an identical manner to the communication device 106, the switch 102 sends a PDelay_Req message having a multicast address as the address (Step S9). Upon receiving that PDelay_Req message, the time server 101 sends a PDelay_Response message having a multicast address as the address (Step S10). The switch 102 refers to the time stamps specified in the PDelay_Response and measures the communication delay with the time server 101.

The time server 101 periodically sends an Announce message in which a multicast address is set in the destination address of the Ethernet (registered trademark) header (Steps S5 and S11), as well as periodically sends a Sync message in which a multicast address is set in the destination address of the Ethernet (registered trademark) header and which contains time information (Steps S6 and S12). When the switch 102 receives from the time server 101 the Announce message sent at Step S5, it appends a VLAN header containing the VLAN ID of the time server 101 to the Announce message as illustrated in FIG. 2, and then transfers the Announce message to the network 105. When the switch 114 receives that Announce message via the network 105, it transfers the Announce message to the communication device 106 without removing the VLAN header.

Moreover, when the switch 102 receives from the time server 101 the Sync message sent at Step S6, it appends a VLAN header containing the VLAN ID of the time server 101 to the Sync message, and adds the transfer operation time of the Sync message and the value of communication delay with the time server 101 to the value in the Correction field of the Sync message before setting the added value in the Correction field of the Sync message. Then, the switch 102 transfers the Sync message to the network 105. When the switch 114 receives that Announce message via the network 105, it transfers the Announce message to the communication device 106 without removing the VLAN header.

Meanwhile, in FIG. 7 is also illustrated a case when the Announce message sent by the time server 101 at Step S11 and the Sync message sent by the time server 101 at Step S12 is not received by the switch 102 due to some malfunctioning.

When the communication device 106 receives the Sync message, which is sent by the time server 101 at Step S6, via the network 105, the switch 102, and the switch 114; it performs a time synchronization operation (Step S20). The detailed sequence followed in the time synchronization operation is described later.

In an identical manner to the time server 101, the time server 104 also periodically sends an Announce message in which a multicast address is set in the destination address of the Ethernet (registered trademark) header (Steps S7 and S13), as well as periodically sends a Sync message in which a multicast address is set in the destination address of the Ethernet (registered trademark) header and which contains time information (Steps S8 and S14). When the switch 103 receives from the time server 104 the Announce message sent at Step S5 or Step S13, it appends a VLAN header containing the VLAN ID of the time server 104 to the Announce message, and then transfers the Announce message to the network 105. When the switch 114 receives that Announce message via the network 105, it transfers the Announce message to the communication device 106 without removing the VLAN header. Moreover, when the switch 103 receives from the time server 104 the Sync message sent at Step S8 or Step S14, it appends a VLAN header containing the VLAN ID of the time server 104 to the Sync message, and adds the transfer operation time of the Sync message and the value of communication delay with the time server 104 to the value in the Correction field of the Sync message before setting the added value in the Correction field of the Sync message. Then, the switch 103 transfers the Sync message to the network 105. When the switch 114 receives that Announce message via the network 105, it transfers the Announce message to the communication device 106 without removing the VLAN header.

When the communication device 106 receives the Sync message, which is sent by the time server 104 at Step S8, via the network 105, the switch 103, and the switch 114; it performs the time synchronization operation (Step S21). Moreover, when the communication device 106 receives the Sync message, which is sent by the time server 104 at Step S14, via the network 105, the switch 103, and the switch 114; it performs the time synchronization operation in an identical manner (Step S22).

Meanwhile, since the Announce messages and the Sync messages are sent via multicast, there is a possibility that the switch 102 receives those messages that have been transferred by the switch 103. However, those messages are appended with respective VLAN headers. Thus, the switch 102 refers to the VLAN IDs specified in the VLAN headers and, if the VLAN IDs are same as the VLAN ID assigned to the time server 104, transfers those messages to the time server 104 after removing the VLAN headers. On the other hand, if the VLAN IDs are not same as the VLAN ID assigned to the time server 101, then the switch 102 does not transfer the message to the time server 101. In an identical manner, there is a possibility that the switch 103 receives the Announce messages and the Sync messages that have been transferred by the switch 102. Then, the switch 102 refers to the VLAN IDs specified in the VLAN headers and, if the VLAN IDs are same as the VLAN ID assigned to the time server 104, transfers those messages to the time server 104 after removing the VLAN headers. On the other hand, if the VLAN IDs are not same as the VLAN ID assigned to the time server 104, then the switch 103 does not transfer the message to the time server 104.

By configuring the switches 102 and 103 in the manner described above, since the time server 101 and the time server 104 do not receive messages intended for each other, malfunctioning of one time server is not allowed to affect the other time server. Moreover, as defined in IEEE 1588, since the time server 101 and the time server 104 serve as the time servers having the highest priority from among the communicable time servers, both the time server 101 and the time server 104 become capable of announcing Announce messages and Sync messages.

Figure 8:
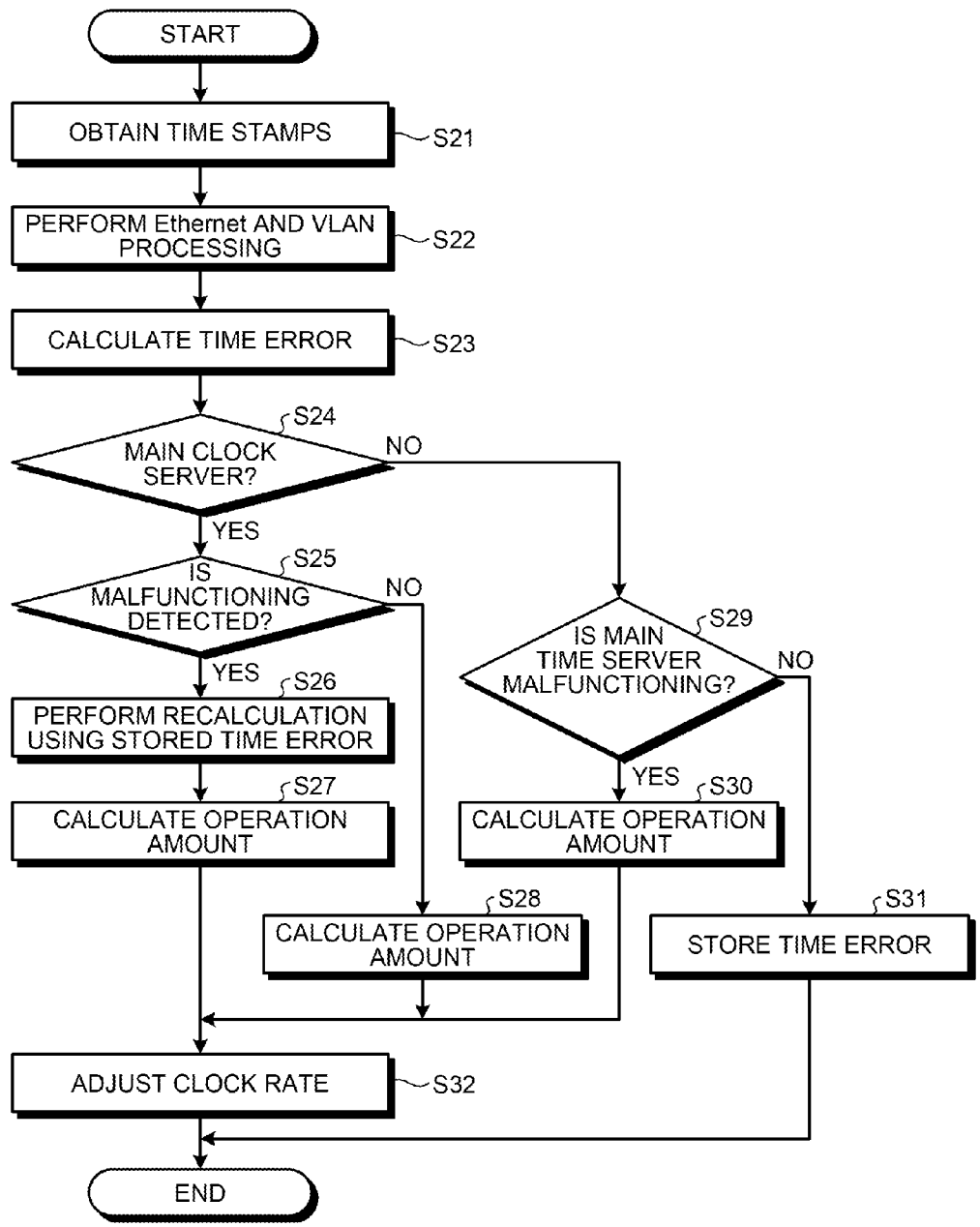
FIG. 8 is a flowchart for explaining a sequence followed in a time synchronization operation.

Explained below with reference to FIG. 8 is the sequence followed in the time synchronization operation performed by the communication device 106 according to the first embodiment. Herein, the explanation is given for a sequence followed after receiving a Sync message that is periodically sent by the time server 101 or the time server 104. The network interface 107 of the communication device 106 sends the received Sync message to the network controller 108. Then, the network controller 108 obtains, as a time stamp, the receiving timing of receiving the Sync message (Step S21). This time stamp is a value measured using the clock 112. Then, the network controller 108 sends the time stamp and the Sync message to the network processing unit 109. Upon receiving the time stamp and the Sync message, the network processing unit 109 verifies the VLAN ID specified in the VLAN header appended to the Sync message after processing the Ethernet (registered trademark) header appended to the Sync message. If that VLAN ID is not same as the VLAN ID assigned to the time server 101 or the time server 104, then the network processing unit 109 destroys the Sync message. On the other hand, if the VLAN ID is same as the VLAN ID assigned to the time server 101 or the time server 104, then the network processing unit 109 sends the Sync message and the time stamp to the protocol processing unit 110 (Step S22). Meanwhile, the network processing unit 109 can also be configured to send, to the protocol processing unit 110, the Ethernet (registered trademark) header along with the Sync message from which the VLAN ID is removed.

Upon receiving the Sync message and the time stamps, the protocol processing unit 110 refers to the time stamps, refers to the time information specified in the Sync message, refers to the communication delay time between the communication device 106 and the switch 114, and refers to a method defined in IEEE 1588; and calculates the time error with respect to the time server that sent the Sync message (Step S23). Moreover, the protocol processing unit 110 determines whether the VLAN ID specified in the VLAN header appended to the Sync message is same as the VLAN ID assigned to the time server 101 serving as the main time server or is same as the VLAN ID assigned to the time server 104 (Step S24). If the VLAN ID is same as the VLAN ID assigned to the time server 101 (YES at Step S24), then the protocol processing unit 110 determines whether or not the time server 101 is malfunctioning (Step S25).

A condition in which the time server 101 is malfunctioning points to a condition in which the Announce message sent by the time server 101 at Step S11 illustrated in FIG. 7 cannot be received by the communication device 106 or a condition in which the Sync message sent by the time server 101 at Step S12 cannot be received by the communication device 106. That is, such malfunctioning either points to a case in which, after receiving an Announce message from the time server 101 in the past, the communication device 106 does not receive the subsequent Announce message even after the elapse in a predetermined period of time; or points to a case in which, after receiving a Sync message from the time server 101 in the past, the communication device 106 does not receive the subsequent Sync message even after the elapse in a predetermined period of time. Moreover, a case in which the timing the time server 101 turns abnormal also points to malfunctioning of the time server 101. More particularly, for example, malfunctioning points to a condition in which the time error calculated at Step S23 becomes equal to or greater than a certain multiple (for example, thrice) of the time error calculated in the past, or a condition in which a regression line calculated using the temporal data of the past time errors has a tilt equal to or greater than a certain number from "0". With the aim of detecting whether or not the timing has turned abnormal, the protocol processing unit 110 instructs the memory unit 113 to store the time errors calculated with respect to the time server 101.

Returning to the explanation with reference to FIG. 8, when it is detected that the time server 101 is not malfunctioning (NO at Step S25), the protocol processing unit 110 outputs the time error calculated at Step S23 to the servo 111. This time error points to the time error with respect to the time server 101. The servo 111 refers to the time error input thereto and calculates an operation amount with respect to the clock 112, and outputs the operation amount to the clock 112 (Step S28). For example, the servo 111 calculates the operation amount using PID control. Depending on the operation amount input thereto, the clock 112 varies the clock rate (Step S32).

Meanwhile, even when the VLAN ID is same as the VLAN ID assigned to the time server 104 (NO at Step S24), the protocol processing unit 110 determines whether or not the time server 101 is malfunctioning (Step S29). When it is detected that the time server 101 is not malfunctioning (NO at Step S29), the protocol processing unit 110 instructs the memory unit 113 to store the time error calculated at Step S23 as well as store the Sync message (Step S31). This time error points to the time error with respect to the time server 104. Then, the protocol processing unit 110 ends the operations. In contrast, when it is detected that the time server 101 is malfunctioning (YES at Step S29), the protocol processing unit 110 outputs the time error calculated at Step S23 to the servo 111. This time error points to the time error with respect to the time server 104. The servo 111 refers to the time error input thereto and calculates an operation amount with respect to the clock 112, and outputs the operation amount to the clock 112 (Step S30). Then, the system control proceeds to Step S32.

Meanwhile, at Step S25, when it is detected that the time server 101 is malfunctioning (YES at Step S25), the protocol processing unit 110 refers to the time error with respect to the time server 104 as stored in the memory unit 113 at Step S31 and refers to the time information specified in the Sync message, and recalculates a time error that is estimated to be the current time error (Step S26). For example, as an estimated time error, the protocol processing unit 110 sets the time error with respect to the time server 104 as stored in the memory unit 113. Alternatively, the protocol processing unit 110 considers a timing T1 as the timing at which the Sync message was previously received from the time server 104, considers a timing T2 as the current time, and considers a time error E as the time error with respect to the time server 104 as stored in the memory unit 113; and sets the estimated time error to a value obtained by multiplying (T2-T2), E, and a value set in advance. The protocol processing unit 110 then outputs the recalculated time error to the servo 111. The servo 111 refers to the time error input thereto and calculates an operation amount with respect to the clock 112, and outputs the operation amount to the clock 112 (Step S27). Then, the system control proceeds to Step S32.

Every time a Sync message is received from the time server 101 or the time server 104, the communication device 106 performs the time synchronization operation described above. That makes it possible to ensure that the time interval of outputting time errors to the servo 111 does not become equal to or greater than a certain time interval. Consequently, the clock rate of the clock 112 can be adjusted without interruption. More particularly, in case the Sync messages from the time server 101 cannot be received in a periodic manner or in case malfunction is detected in the time of the time server 101, the communication device 106 does not use a Sync message received from the time server 101 for the adjustment of clock rate of the clock 112. Instead, the communication device 106 uses the Sync message received recently from the time server 104. That enables achieving a solution to the time error of the communication device 106. That is, time error obtained from the Sync messages sent either by the time server 101 or the time server 104 is output to the servo 111 on a constant basis. Therefore, even when the time server 101 is malfunctioning, as long as the time server 104 is functioning properly, the time of the communication device 106 can be synchronized with the time of the time server 104. That enables achieving a solution to the time error of the communication device 106. With that, when a plurality of time servers is installed in the same network and is made redundant; even if a particular time server is malfunctioning, the time accuracy of the communication device can be maintained.

Second Embodiment

Explained below is a second embodiment of the communication device and the time synchronization system. The constituent elements identical to the first embodiment described above are referred to by the same reference numerals and the explanation thereof is not repeated.

In the second embodiment, during the time synchronization operation described above, when the time server 101 and the time server 104 are functioning normally, the protocol processing unit 110 of the communication device 106 calculates the time error using a Sync message irrespective of whether that Sync message was sent by the main time server or sent by the sub-time server, and sends the time error to the servo 111. In contrast, in case it is detected that the time server sending the Sync messages is malfunctioning or in case it has been detected in the past that the time server sending the Sync messages was malfunctioning, the protocol processing unit 110 does not calculate the time errors using the Sync messages and ends the time synchronization operation. That is, the protocol processing unit 110 calculates a time error only when a Sync message is received from a time server not detected to be malfunctioning, and then outputs the time error to the servo 111. Moreover, in case it is detected that the time server sending the Sync messages is malfunctioning, the protocol processing unit 110 indicates which of the time servers 101 and 104 is malfunctioning and stores, in the memory unit 113, malfunctioning detection data that indicates malfunctioning of the time server sending the Sync messages. By referring to the malfunctioning detection data, the protocol processing unit 110 can determine whether or not it has been detected in the past that the time server sending the Sync messages was malfunctioning. Meanwhile, the remaining configuration of the communication device 106 as well as the configuration of the time synchronization system is identical to that descried above in the first embodiment.

Figure 9:
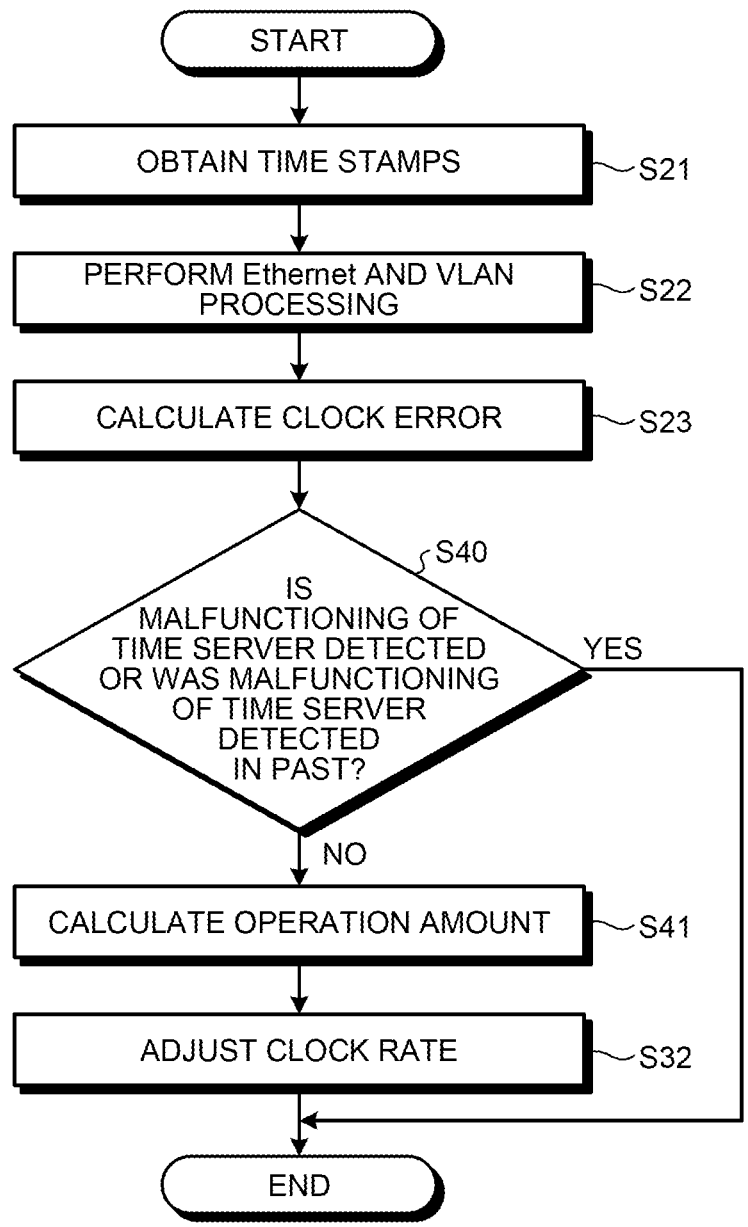
FIG. 9 is a flowchart for explaining a sequence followed in the time synchronization operation according to a second embodiment.

Explained below with reference to FIG. 9 is the sequence followed in the time synchronization operation performed by the communication device 106 according to the second embodiment. Meanwhile, the sequence followed in the time synchronization communication operation performed in the time synchronization system is identical to that described above in the first embodiment with reference to FIG. 7. The communication device 106 performs the time synchronization operation after receiving a Sync message that is periodically sent from the time server 101 or the time server 104. The operations from Step S21 to Step S23 are identical to the operations described in the first embodiment. At Step S40, the protocol processing unit 110 of the communication device 106 determines whether or not the time server sending the Sync messages is malfunctioning or determines whether or not it has been detected in the past that the time server sending the Sync messages was malfunctioning. The method of detecting whether or not the time server sending the Sync messages is malfunctioning is, for example, identical to the method of detecting whether or not there is an error in the timing of the time server as described in the first embodiment. In order to determine of whether or not it has been detected in the past that the time server sending the Sync messages was malfunctioning, the protocol processing unit 110 determines whether or not the memory unit 113 has been storing the malfunctioning detection data that indicates malfunctioning of the time server sending the Sync messages.

When the time server sending the Sync messages is detected not to be malfunctioning and when it is determined that no malfunctioning of the time server was detected in the past (NO at Step S40), the protocol processing unit 110 outputs the time error calculated at Step S23 to the servo 111 in an identical manner to Steps S28 and S30 described above. The servo 111 refers to the time error input thereto and calculates an operation amount with respect to the clock 112, and outputs the operation amount to the clock 112 (Step S41). The subsequent operation at Step S32 is identical to that described above in the first embodiment.

On the other hand, when the time server sending the Sync messages is detected to be malfunctioning (YES at Step S40), the protocol processing unit 110 indicates which of the time servers 101 and 104 is malfunctioning and stores in the memory unit 113 the malfunctioning detection data that indicates malfunctioning of the time server sending the Sync messages. That marks the end of the time synchronization operation. Moreover, even when it is determined that malfunctioning of the time server was detected in the past (YES at Step S40), the time synchronization operation is ended in an identical manner.

Every time a Sync message is received from the time server 101 or the time server 104, the communication device 106 performs the time synchronization operation described above. In this operation, irrespective of whether a Sync message is sent by the main time server or sent by the sub-time server and as long as no malfunctioning is detected in the time server sending the Sync message, the communication device 106 adjusts the clock rate of the clock 112 using the received Sync message. If either the time server 101 or the time server 104 is detected to be malfunctioning, then the communication device 106 adjusts the clock rate of the clock 112 using the Sync message received only from the normal time server.

With the configuration described above, even when there is an error in the timing of the time server 101 or when the Sync messages cannot be received from the time server 101, the communication device 106 can use the Sync messages sent by the time server 104 and adjust the clock rate of the clock 112 without interruption. Besides, in an identical manner to the first embodiment, by making use of VLAN, the time servers 101 and 104 are disabled from communicating with each other. Hence, malfunctioning of one time server is not allowed to affect the other time server. Moreover, under the normal condition, the clock rate of the clock 112 is adjusted using the Sync messages received from the time server 101 as well as from the time server 104. Therefore, the time interval of adjusting the clock 112 becomes shorter than in the case of the first embodiment. Hence, according to the second embodiment, the timing accuracy of the communication device can be maintained in a more efficient manner.

Third Embodiment

Explained below is a third embodiment of the communication device and the time synchronization system. The constituent elements identical to the first embodiment or the second embodiment described above are referred to by the same reference numerals and the explanation thereof is not repeated.

In the first embodiment described above, the explanation is given for a configuration in which, when the time server 101 serving as the main time server is malfunctioning, the target time server for time synchronization is switched to the time server 104 serving as the sub-time server. In the third embodiment, the explanation is given for a configuration in which, after the target time server for time synchronization is switched to the time server 104 serving as the sub-time server, the time server 101 is restored as the target time server for time synchronization. In the third embodiment, once the communication device 106 detects that the time server 101 is malfunctioning; the operator restores the time server 101 and connects it to the switch 102. Consequently, the time server 101 resumes sending Announce messages and Sync messages. Then, the network interface 107 of the communication device 106 receives those messages. Upon receiving those messages, the functions performed by the network interface 107 and the network controller 108 are identical to those described above in the first embodiment. The protocol processing unit 110 calculates a time error using a Sync message sent by the time server 101. However, only after the timing of the time server 101 becomes normal and stable, the protocol processing unit 110 restores the time server 101 as the target time server for time synchronization and outputs the calculated time error to the servo 111. On the other hand, in case the time of the time server 101 is either not normal or not stable even if normal, then the protocol processing unit 110 does not restore the time server 101 as the target time server for time synchronization and stores the calculated time error in the memory unit 113. Meanwhile, the remaining configuration of the communication device 106 as well as the configuration of the time synchronization system is identical to that described above in the first embodiment.

Figure 10:
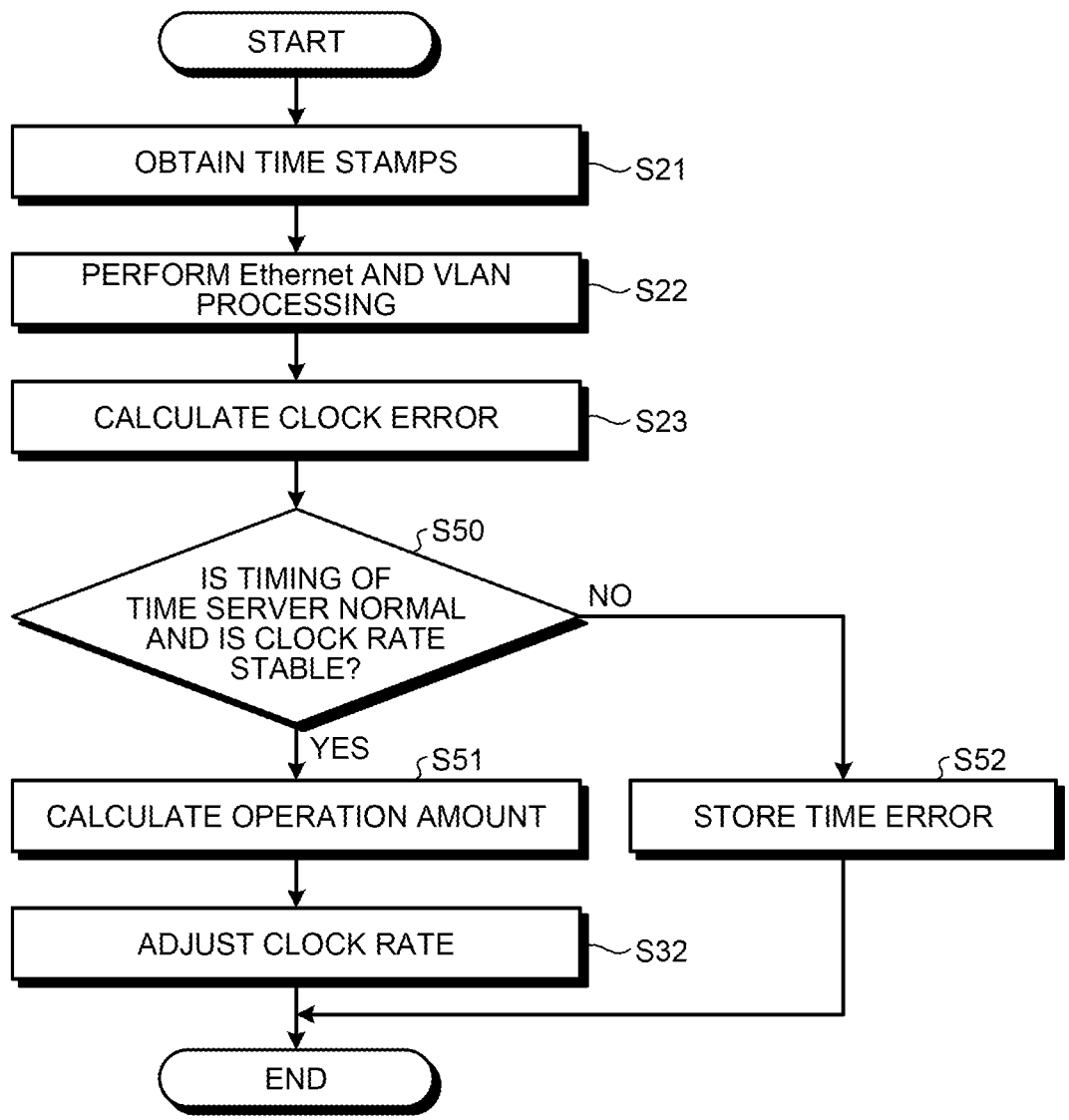
FIG. 10 is a flowchart for explaining a sequence followed in the time synchronization operation according to a third embodiment.

Explained below with reference to FIG. 10 is the sequence followed in the time synchronization operation performed by the communication device 106 according to the third embodiment. Meanwhile, the sequence followed in the time synchronization communication operation performed in the time synchronization system is identical to that described above in the first embodiment with reference to FIG. 7. In FIG. 10, the explanation is given for a sequence followed when the communication device 106 switches the target time server for time synchronization from the time server 101 serving as the main time server to the time server 104 serving as the sub-time server, and then receives a Sync message from the time server 104. The operations at Steps S21 to S23 are identical to the operations described in the first embodiment. At Step S50, the protocol processing unit 110 detects whether or not the timing of the time server 101 calculated at Step S23 is normal and stable. The method of detecting whether or not the timing of the time server 101 is normal is, for example, identical to that described in the first embodiment. The condition in which the time of the time server 101 is normal and stable points to a condition in which, for example, the time error with respect to the time server 101 calculated at Step S23 as well as the time error with respect to the time server 101 calculated for a certain period of time in the past and stored in the memory unit 113 is equal to or smaller than a predetermined value (such as, 1 µsecond).

When the time of the time server 101 is detected to be normal and stable (YES at Step S50), the protocol processing unit 110 outputs the time error calculated at Step S23 to the servo 111. Then, the servo 111 refers to the time error input thereto and calculates an operation amount, and outputs the operation amount to the clock 112 (Step S51). The subsequent operation at Step S32 is identical to that described above in the first embodiment. On the other hand, in case the time of the time server 101 is either not normal or not stable even if normal (NO at Step S50), then the protocol processing unit 110 stores the calculated time error calculated at Step S23 in the memory unit 113 (Step S52). This time error is used in the detection at Step S50 performed subsequently and thereafter.

In this way, in the third embodiment, even upon receiving a Sync message from the time server 101, the communication device 106 does not immediately switch the target time server for time synchronization from the time server 104 to the time server 101. Instead, the communication device 106 verifies, for a certain period of time, the time error that is calculated using a Sync message received from the time server 101; and, when it is detected that the timing of the time server 101 is normal and stable, switches the target time server for time synchronization to the time server 101. With such a configuration, even when an error occurs in the timing of the time server 101 that has been restored, the timing accuracy of the communication device 106 can be maintained without getting affected by that error. Moreover, in an identical manner to the first embodiment, by making use of VLAN, the time servers 101 and 104 are disabled from communicating with each other. Hence, malfunctioning of one time server is not allowed to affect the other time server.

Once it is detected that the time of the time server 101 has become normal and stable, the communication device 106 can perform the time synchronization operation by following the sequence illustrated in FIG. 8 or FIG. 9.

Fourth Embodiment

Explained below is a fourth embodiment of the communication device and the time synchronization system. The constituent elements identical to the first embodiment to the third embodiment described above are referred to by the same reference numerals and the explanation thereof is not repeated.

Figure 11:
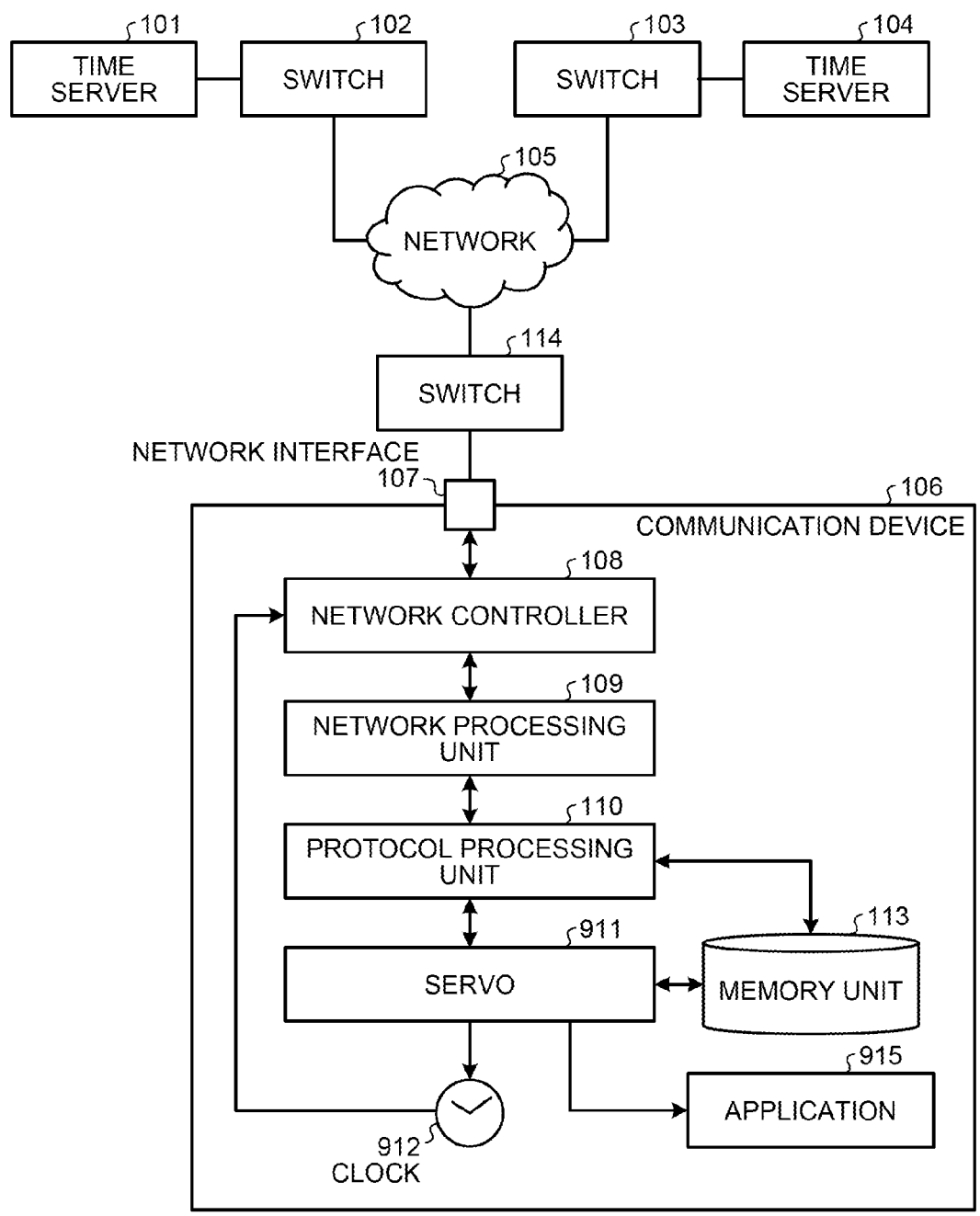
FIG. 11 is a diagram illustrating a configuration of the time synchronization system according to a fourth embodiment.

In the embodiments described above, the clock 112 is assumed to be an oscillator that can be subjected to changes in the clock rate. In contrast, in the fourth embodiment, the time is assumed to be an oscillator that cannot be subjected to changes in the clock rate. When such a clock is used and when the clock speed of that clock is different than the clock speed of the time server 101 or the clock speed of the time server 104, the clock counter of that clock gradually grows away from the time of the time server 101 or time of the time server 104. FIG. 11 is a diagram illustrating a configuration of the time synchronization system according to the fourth embodiment. As illustrated in FIG. 11, in the time synchronization system according to the fourth embodiment, the communication device 106 includes a clock 912 in place of the clock 112 illustrated in FIG. 1, includes a servo 911 in place of the servo 111 illustrated in FIG. 1, and includes an application 915 in place of the application 115 illustrated in FIG. 1.

In the fourth embodiment, the protocol processing unit 110 does not detect whether or not the time server 101 is malfunctioning. Instead, the servo 911 determines whether or not the time server 101 is malfunctioning and whether or not the clock rate is normal. Moreover, the servo 911 calculates correction data using a Sync message received from the time server 101, calculates correction data using a Sync message received from the time server 104, and stores both sets of correction data in the memory unit 113. FIG. 12 is a diagram illustrating the sets of correction data. As illustrated in FIG. 12, a set of correction data contains, in a corresponding manner, the time in the time server at the Sync message receiving timing (i.e., a value obtained by adding the value of Correction field to the receiving timing of the Sync message as specified in the Sync message and then by subtracting the communication delay time between the communication device 106 and the switch 114); the clock counter of the clock 912 at the Sync message receiving timing; and the time error per second caused by the difference in the clock rates of the clock 912 with respect to the time server at the Sync message receiving timing.

Meanwhile, the servo 911 does not output the operation amount to the clock 912. Instead, in response to a request from the application 915, the servo 911 obtains the clock counter from the clock 912, calculates the current time using the correction data regarding the time server that is indicated by a reference server value (described later) stored in the memory unit 113, and outputs the current time to the application 915. For example, when the clock 912 is a crystal oscillator of 25 MHz, the servo 911 calculates the current time using Equation 1 given below.

$$\text{current time (in seconds)} = \text{(the time in time server at Sync message receiving timing)} + \text{(clock counter} - \text{clock counter at Sync message receiving timing)}/25/1000000 * (1 + \text{time error [n seconds] per second due to difference in clock rate}/1000000000) \quad \text{(Equation 1)}$$

Thus, in the fourth embodiment, instead of adjusting the clock rate of the clock 912; the communication device 106 reads, when the current time is required, the clock counter of the clock 912 and converts it into the current time. For that reason, every time a Sync message is received, the servo 911 calculates the correction data necessary for the conversion of the clock counter into the current time, and stores that correction data in the memory unit 113.

Moreover, in the memory unit 113, the servo 911 stores a value (referred to as reference server value) indicating which correction data is to be used from among the correction data with respect to the time server 101 and the correction data with respect to the time server 104. More particularly, when it is detected that the time of the time server 101 is not normal or when the clock rate of the time server 101 is not stable, the servo 911 updates the reference server value in the memory unit 113 in such a way that the reference server value indicates the use of the correction data with respect to the time server 104. Meanwhile, when it is detected that the time of the time server 104 is not normal or when the clock rate of the time server 104 is not normal, the servo 911 stores in the memory unit 113 a value (referred to as sub-time server abnormal value) indicating that the time server 104 serving as the sub-time server is malfunctioning.

Thus, the memory unit 113 stores therein the correction data with respect to the time server 101, the correction data with respect to the time server 104, the reference server value, and the sub-time server abnormal value. The application 915 obtains the current time not from the clock 912 but from the servo 911. Meanwhile, the remaining configuration of the communication device 106 as well as the configuration of the time synchronization system is identical to that described above in the first embodiment.

Figure 13:
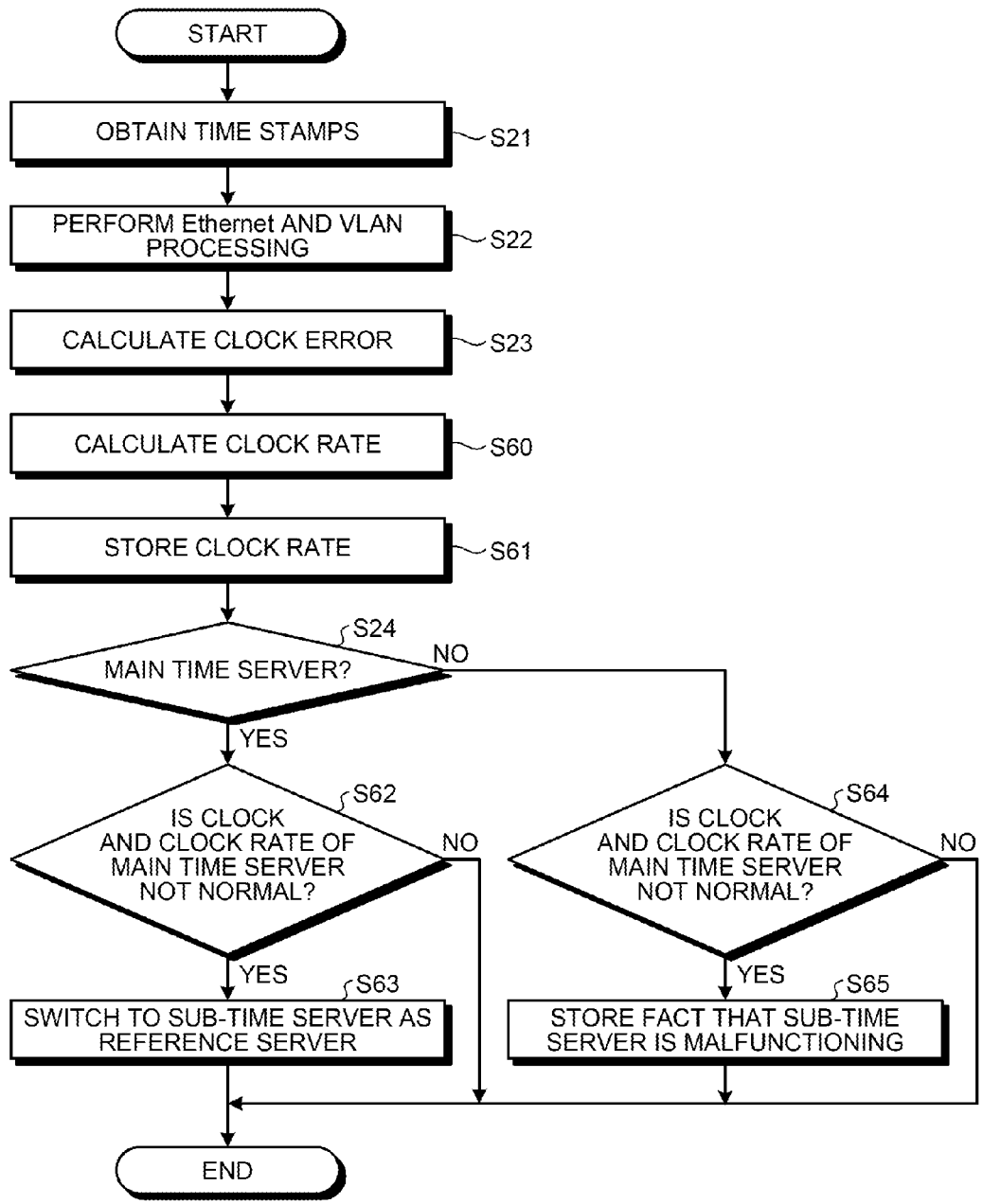
FIG. 13 is a flowchart for explaining a sequence followed in the time synchronization operation according to the fourth embodiment.

Explained below with reference to FIG. 13 is the sequence followed in the time synchronization operation performed by the communication device 106 according to the fourth embodiment. Meanwhile, the sequence followed in the time synchronization communication operation performed in the time synchronization system is identical to that described above in the first embodiment with reference to FIG. 7. The communication device 106 performs the time synchronization operation after receiving a Sync message that is periodically sent from the time server 101 or the time server 104. The operations performed at Steps S21 and S22 are identical to the operations described in the first embodiment. At Step S23, the protocol processing unit 110 of the communication device 106 receives a Sync message and the time stamps and then calculates the time error with respect to the time server that sent the Sync message. At that time, in the fourth embodiment, the protocol processing unit 110 refers to the time stamps and refers to the correction data with respect to the time server indicated by the reference server value stored in the memory unit 113, and accordingly calculates the receiving timing of receiving the Sync message. Then, the protocol processing unit 110 calculates the time error with respect to that time server by referring to the receiving timing, by referring to the time information specified in the Sync message, by referring to the communication delay time between the communication device 106 and the switch 114, and by referring to a method defined in IEEE 1588. Meanwhile, the time server that sent the Sync message is not necessarily same as the time server indicated by the reference server value. Subsequently, the protocol processing unit 110 outputs the calculated time error to the servo 911.

The servo 911 calculates the clock rate of the clock 912 using PID control in which the time error serves as the input (Step S60). Then, the servo 911 refers to the calculated clock rate, calculates the time error per second caused due to the difference in the clock rates, and updates the calculated value in the correction data that is stored in the memory unit 113 and that corresponds to the time server which sent the Sync message. Moreover, in the correction data, the servo 911 updates the time of the time server at the Sync message receiving timing and the clock counter of the clock 912 at the Sync message receiving timing (Step S61). Meanwhile, at Step S24, the protocol processing unit 110 determines whether the VLAN ID specified in the VLAN header appended to the Sync message is same as the VLAN ID assigned to the time server 101 serving as the main time server or is same as the VLAN ID assigned to the time server 104, and outputs the determination result to the servo 911. If the VLAN ID is same as the VLAN ID assigned to the time server 101 (YES at Step S24), then the servo 911 detects whether or not the time of the time server 101 is normal and whether or not the clock rate of the time server 101 is normal (Step S62). The method of detecting whether or not the time of the time server 101 is normal is, for example, identical to the method implemented by the protocol processing unit 110 in the first embodiment. The condition in which the clock rate is not normal points to a condition in which, for example, the difference or the ratio between the time error calculated at Step S60 and the clock rate of the time server 104 is equal to or greater than a value set in advance. Meanwhile at Step S62, the servo 911 refers to the correction data of the time server 104 for the time error per second caused due to the difference in the clock rates, and calculates the clock rate.

When it is detected that the time of the time server 101 is normal and that the clock rate of the time server 101 is stable (NO at S62), the servo 911 ends the time synchronization operation. On the other hand, when it is detected that the time of the time server 101 is not normal or that the clock rate of the time server 101 is not stable (YES at Step S62), the servo 911 updates the reference server value in the memory unit 113 in such a way that the reference server value indicates the use of the correction data with respect to the time server 104 (Step S63). That marks the end of the time synchronization operation.

Meanwhile, even when the VLAN ID is same as the VLAN ID assigned to the time server 104 (NO at Step S24); in an identical manner to Step S62, the servo 911 detects whether or not the time of the time server 104 is normal and whether or not the clock rate of the time server 104 is normal (Step S64). When it is detected that the time of the time server 104 is normal and that the clock rate of the time server 104 is normal (NO at S64), the servo 911 ends the time synchronization operation. On the other hand, if it is detected that the time of the time server 104 is not normal or that the clock rate of the time server 104 is not normal (YES at Step S64); the servo 911 stores, in the memory unit 113, the sub-time server abnormal value indicating that the time server 104 serving as the sub-time server is malfunctioning (Step S65). That marks the end of the time synchronization operation.

Every time a Sync message is received from the time server 101 or the time server 104, the communication device 106 performs the time synchronization operation described above. Meanwhile, in case an Announce message or a Sync message is not received from the time server 101 even after the elapse in a predetermined period of time, then the protocol processing unit 110 can update the reference server value in the memory unit 113 in such a way that the reference server value indicates the use of the correction data with respect to the time server 104. Moreover, consider the case when it is detected that the time of the time server 104 is not normal and when the sub-time server abnormal value is stored in the memory unit 113. In that case, if a Sync message is received from the time server 101 and in case it is detected at Step S62 that the time server 101 is malfunctioning, then the servo 911 can be configured to not perform the operation at Step S63.

According to the configuration described above, even if the clock 912 is not configured to change the clock rate, when the timing of the time server 101 is not normal or when the Sync messages cannot be received from the time server 101 in a periodic manner, the communication device 106 switches to the correction data with respect to the time server 104 as the correction data for time error calculation. That enables maintaining the accuracy of the time obtained by the application 915. Besides, in an identical manner to the first embodiment, by making use of VLAN, the time servers 101 and 104 are disabled from communicating with each other. Hence, malfunctioning of one time server is not allowed to affect the other time server. Moreover, even when the timing of the time server 101 turns abnormal, the correction data with respect to the time server 104 is not affected. That enables the communication device to instantly restore the timing accuracy to the normal condition.

Fifth Embodiment

Explained below is a fifth embodiment of the communication device and the time synchronization system. The constituent elements identical to the first embodiment to the fourth embodiment described above are referred to by the same reference numerals and the explanation thereof is not repeated. In the fifth embodiment, the configuration of the communication device 106 and the configuration of the time synchronization system are identical to the fourth embodiment. In the fourth embodiment, the explanation was given for a case in which, when the time server 101 serving as the main time server is malfunctioning, the correction data for time error calculation is switched to the correction data with respect to the time server 104 serving as the sub-time server. In the fifth embodiment, the explanation is given for a configuration in which, after the correction data for time error calculation is switched to the correction data with respect to the time server 104, the correction data for time error calculation is restored to the correction data with respect to the time server 101.

In the fifth embodiment, once the communication device 106 detects that the time server 101 is malfunctioning; the operator restores the time server 101 and connects it to the switch 102. Consequently, the time server 101 resumes sending Announce messages and Sync messages. Then, the network interface 107 of the communication device 106 receives those messages. Upon receiving those messages, the functions performed by the network interface 107 and the network controller 108 are identical to those described above in the first embodiment. The protocol processing unit 110 calculates a time error using a Sync message sent by the time server 101 and the servo 911 calculates a clock rate using that time error. However, only after the time of the time server 101 becomes normal and stable, the protocol processing unit 110 updates the reference server value in the memory unit 113 in such a way that the reference server value indicates the use of the correction data with respect to the time server 101. On the other hand, in case the time of the time server 101 is either not normal or not stable even if normal, the servo 911 does not update the reference server value. Meanwhile, the remaining configuration of the communication device 106 as well as the configuration of the time synchronization system is identical to that described above in the first embodiment.

Figure 14:
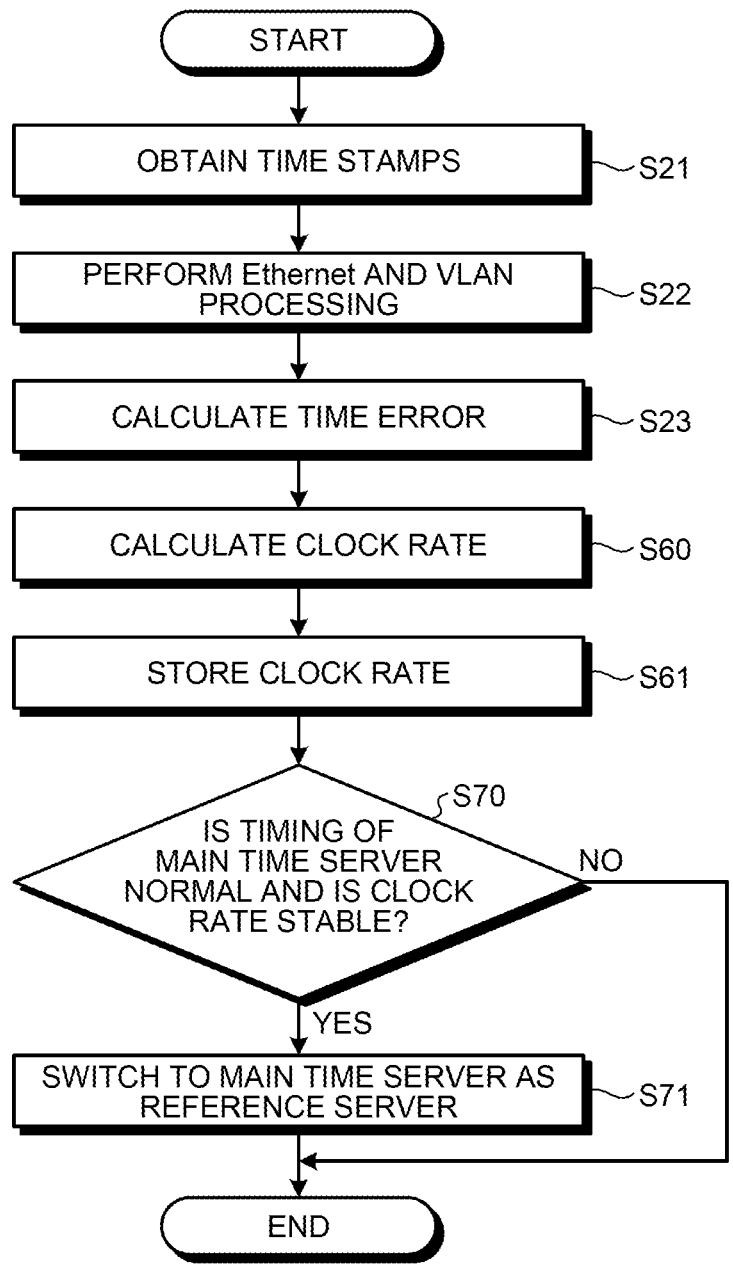
FIG. 14 is a flowchart for explaining a sequence followed in the time synchronization operation according to a fifth embodiment.

Explained below with reference to FIG. 14 is the sequence followed in the time synchronization operation performed by the communication device 106 according to the fifth embodiment. Meanwhile, the sequence followed in the time synchronization communication operation performed in the time synchronization system is identical to that described above in the first embodiment with reference to FIG. 7. In FIG. 14, the explanation is given for a sequence followed after the communication device 106 has switched to the correction data with respect to the time server 104 as the correction data for time error calculation and, while synchronizing the timing thereof using a Sync message received from the time server 104, has received a Sync message from the time server 101. The operations performed at Steps S21 to S23 are identical to the operations described in the first embodiment. The operations performed at Steps S60 and S61 are identical to the operations described in the fourth embodiment. At Step S70, the servo 911 detects whether or not the timing of the time server 101 is normal and whether or not the clock rate of the time server 101 is stable. The condition in which the time of the time server 101 is normal points to a condition in which, for example, the time errors calculated for a certain number of times in the past using Sync messages received from the time server 101 are within values set in succession. The condition in which the clock rate of the time server 101 is stable points to a condition in which, for example, with respect to all clock rates of the time server 101 obtained for a certain number of times in the past, the difference or the ratio of the clock rate of the time server 104 as stored in the memory unit 113 is within a set value.

When it is detected that the time of the time server 101 is normal and that the clock rate of the time server 101 is stable (YES at S70), the servo 911 updates the reference server value in the memory unit 113 in such a way that the reference server value indicates the time server 101 (Step S71). On the other hand, when it is detected that the time of the time server 101 is not normal or that the clock rate of the time server 101 is not stable (NO at Step S70), the servo 911 ends the time synchronization operation.

According to the configuration described above, even if the clock 912 is not configured to change the clock rate, when the time of the restored time server 101 is not normal or when the clock rate of the restored time server 101 is not stable, the communication device 106 switches to the correction data with respect to the time server 104 as the correction data for time error calculation. Hence, the time accuracy of the communication device 106 can be maintained without getting affected by the error in the time of the time server 101. Moreover, in an identical manner to the first embodiment, by making use of VLAN, the time servers 101 and 104 are disabled from communicating with each other. Hence, malfunctioning of one time server is not allowed to affect the other time server.

Meanwhile, once it is detected that the timing of the time server 101 is normal and that the clock rate of the time server 101 is stable, the communication device 106 can follow the time synchronization operation by following the sequence illustrated in FIG. 13.

MODIFICATION EXAMPLES

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. For example, of all constituent elements described in the embodiments, some constituent elements can be deleted or some constituent elements can be combined in an arbitrary manner. Moreover, various modifications as described below can be implemented.

In each embodiment described above, various programs executed in the communication device 106 can be saved on a computer connected to a network and downloaded from that computer via the network. Alternatively, those various programs can be provided in the form of a computer program product by storing them as installable or executable files on a computer-readable recording medium such as a CD-ROM, a flexible disk (FD), a CD-R, or a DVD (digital versatile disk).

In the first to third embodiments described above, the time servers 101 and 104 are connected to the network 105 via different switches 102 and 103, respectively. However, alternatively, the time servers 101 and 104 can be connected to the network 105 via a single switch. Moreover, the time server 101, the time server 104, and the communication device 106 can be connected to the network 105 via a single switch. In that case too, in an identical manner to the first to third embodiments described above, each of the time servers 101 and 104 can receive message not appended with VLAN headers; and, while communicating with the time servers 101 and 104, the communication device 106 can communicate messages appended with VLAN headers each including a VLAN ID.

In the first to third embodiments described above, as long as the clock 112 is an oscillator that can be subjected to changes in the clock rate, it is not confined to a crystal oscillator or an Adder Based Clock.

In the first to fifth embodiments described above, as defined in IEEE 1588; the switch 102, the switch 103, and the switch 114 can be configured to hold the Sync messages from the receipt thereof until the completion of the transfer of the Sync messages. Moreover, immediately after sending a Sync message, the time servers 101 and 104 can be configured to send a Follow_Up message that contains the time information indicating the sending timing of that Sync message. Moreover, the switch 102, the switch 103, and the switch 114 can be configured to set, in the Correction field of the respective Follow_Up messages, a value obtained by adding the transfer operation time of the Sync message and the communication delay up to the adjacent IEEE 1588 to the value set in the Correction field of the Follow_Up message. In that case, the protocol processing unit 110 of the communication device 106 refers to not only the Sync message but also to the time information set in the Follow_Up message and indicating the sending timing of the Sync message and to the value in the Correction field, and calculates the time error with respect to the time server 101 or the time server 104.

In the first to fifth embodiments described above, the communication device 106, the switch 114, the switch 102, and the switch 103 may not be configured to measure the communication delay with the adjacent IEEE 1588 using the Peer to peer delay mechanism. In that case, using an End to End delay mechanism defined in IEEE 1588, the communication device 106 measures the communication delay between itself and the time server 101 and measures the communication delay between itself and the time server 104. When the switch 114, the switch 102, and the switch 103 receive a Sync message, only the transfer operation time of the Sync message is added to the value set in the Correction field of the Sync message and then the obtained value is set in the Correction field of the Sync message.

Consider the case in which a Follow_Up message is used along with the End to End delay mechanism. In that case, the switch 114, the switch 102, and the switch 103 set, in the Correction field of the Follow_Up message instead of the Correction field of the Sync message, a value obtained by adding only the transfer operation time of the Sync message to the value in the Correction field of the Follow_Up message.

In the first to fifth embodiments described above, at Step S23 illustrated in FIGS. 8 to 10, the protocol processing unit 110 can be configured to refer to the time information specified in the Sync messages received in the past from the time server 101, to calculate a skew representing difference in the clock speeds, and to output the skew to the servo 111. In that case, the protocol processing unit 110 stores the skew, which is calculated regarding the time server 101 at Step S23, in the memory unit 113. Moreover, at Steps S27, S28, and S30; the servo 111 calculates the operation amount using the skew. Furthermore, at Step S31, the protocol processing unit 110 stores the skew regarding the time server 104 in the memory unit 113.

In the first to third embodiments described above, apart from the time servers 101 and 104, it is possible to connect a new time server to the network 105 via an Ethernet (registered trademark) switch. In that case, when the time server 101 or the time server 104 is functioning normally and when a Sync message is received from the newly-connected time server, then the communication device 106 performs the operation at Step S31. Moreover, when only the time server 101 starts malfunctioning and when a Sync message is received from the time server 104, then the communication device 106 performs the operations at Steps S30 and S32. Furthermore, when the time server 101 as well as the time server 104 starts malfunctioning and when a Sync message is received from the newly-connected time server, the communication device 106 performs the operations at Steps S30 and S32 and the operation at Step S32.

Besides, in this case, when it is determined that all time servers are functioning normally and when a Sync message is received from either the time server 101, or the time server 104, or the newly-connected time server; then, regarding the time errors calculated at Step S23, if the time error of any one of the time servers is far away (for example, by 2 μsecond) from the time errors of the remaining two time servers, then the communication device 106 can be configured to detect that particular time server to be malfunctioning. In this way, by installing three time servers in the time synchronization system, the time server having an abnormal time can be identified by a majority.

In the fourth embodiment or the fifth embodiment described above too, apart from the time servers 101 and 104, it is possible to connect a new time server to the network 105 via an Ethernet (registered trademark) switch. In that case, the servo 911 stores in the memory unit 113 the correction data with respect to each time server. Moreover, considering that the time server 101, the time server 104, and the newly-connected time server have the priority in that order, the servo 911 stores in the memory unit 113 the reference server value indicating the normal time server. With such a configuration too, the time server having an abnormal timing can be identified by a majority.

In the third embodiment or the fifth embodiment described above, instead of automatic switching of the target time server for time synchronization from the time server 104 to the time server 101, the protocol processing unit 110 of the communication device 106 can switch the target time server for time synchronization in response to an instruction from the operator. For example, the communication device 106 can be configured to include an output unit such as a display for displaying information and an operation input unit such as a switch for allowing the operator to input operations. Then, at Step S50, when it is detected that the timing of the time server 101 is normal and stable, the protocol processing unit 110 can display on the output unit a message notifying the readiness for switching the target time server for time synchronization and, upon receiving an operation input from the operator via the input unit, can switch the target time server for time synchronization from the time server 104 to the time server 101. Meanwhile, instead of displaying a message notifying the readiness for switching the target time server for time synchronization, the output unit can be configured to send that message to an operation center via the network 105 installed at a remote location.

In the fifth embodiment described above too, instead of automatic switching of the correction data for time error calculation to the correction data with respect to the time server 101, the servo 911 of the communication device 106 can switch the correction data in response to an instruction from the operator. In this case too, for example, the communication device 106 can be configured to include an output unit such as a display and an operation input unit such as a switch. Then, at Step S70, when it is detected that the time of the time server 101 is normal and that the clock rate of the time server 101 is stable, the servo 911 displays on the output unit a message notifying the readiness for switching the correction data for time error calculation and, upon receiving an operation input from the operator via the input unit, can switch the correction data for time error calculation to the correction data with respect to the time server 101. At the time of switching, for example, the servo 911 updates the reference server value in the memory unit 113 in such a way that the reference server value indicates the use of the correction data with respect to the time server 101. Meanwhile, the output unit can be configured to send the message notifying the readiness for switching the correction data to an operation center via the network 105 installed at a remote location.

According to an aspect of the embodiment, when a plurality of time servers is installed in the same network and is made redundant, the timing accuracy of a communication device can be maintained in case a time server is malfunctioning or is being restored.

BRIEF DESCRIPTION OF DRAWINGS

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that is connected to a plurality of time servers via a network configured with one or more transfer devices, the communication device comprising:

a network controller
 configured to receive a message containing time information which indicates a timing counted by one of the time servers and containing a network identifier, and configured to obtain a receiving timing of receiving the message;
a network processing unit configured to, when the network identifier specified in the message does not match with any network identifier assigned to any one of the plurality of time servers, destroy the message;
a protocol processing unit
 configured to, when the network identifier has a match, calculate a time error by referring to the time information specified in the message and by referring to the receiving timing,
 configured to detect whether a first time server is malfunctioning, and
 configured to, when it is detected that the first time server is malfunctioning, output the time error calculated by referring to a message containing a network identifier assigned to a second time server;
a servo configured to calculate an operation amount by referring to the time error; and
a clock configured to vary a clock rate according to the operation amount.

2. The communication device according to claim 1, wherein
 when it is detected that the first time server is not malfunctioning, the protocol processing unit outputs the time error calculated by referring to the received message.

3. The communication device according to claim 2, wherein
 when the network identifier specified in the message is the same as a network identifier assigned to the second time server and when it is detected that the first time server is not malfunctioning, the protocol processing unit stores in a memory unit the time error calculated by referring to the message,
 when the network identifier specified in the message is the same as a network identifier assigned to the first time server and when it is detected that the first time server is not malfunctioning, the protocol processing unit outputs the time error calculated by referring to the message,
 when the network identifier specified in the message is the same as a network identifier assigned to the second time server and when it is detected that the first time server is malfunctioning, the protocol processing unit outputs the time error calculated by referring to the message, and
 when the network identifier specified in the message is the same as a network identifier assigned to the first time server and when it is detected that the first time server is malfunctioning, the protocol processing unit outputs an estimated time error that is calculated by referring to the time error stored in the memory unit.

4. The communication device according to claim 3, wherein
 when the message containing the network identifier assigned to the first time server is newly received after it has been detected that the first time server is malfunctioning, the protocol processing unit detects whether a time counted by the first time server is normal and stable by referring to the time error calculated using the message and by referring to the time error calculated using messages received in past,
 when it is detected that the time counted by the first time server is not normal or not stable, the protocol processing unit outputs the time error calculated by referring to a message containing the network identifier assigned to the second time server, and
 when it is detected that the time counted by the first time server is normal and stable, the protocol processing unit outputs the time error calculated by referring to a message containing the network identifier assigned to the first time server.

5. A time synchronization system comprising the communication device according to claim 4, and a network configured with one or more transfer devices that relay a connection between the plurality of time servers and the communication device, wherein
 upon receiving a first message that contains the time information sent by the first time server, the transfer device connected to the first time server transfers a second message generated by appending to the first message a header that contains the network identifier assigned to the first time server,
 upon receiving a third message that contains the time information sent by the second time server, the transfer device connected to the second time server transfers a fourth message generated by appending to the third message a header that contains the network identifier assigned to the second time server, and
 the transfer device connected to the communication device
  receives the second message via the network and
  transfers the second message to the communication device as well as
  receives the fourth message via the network and transfers the fourth message to the communication device.

\* \* \* \* \*